US012596798B2

(12) United States Patent
Jaleel et al.

(10) Patent No.: US 12,596,798 B2
(45) Date of Patent: Apr. 7, 2026

(54) PROBABILISTIC TRACKER MANAGEMENT FOR MEMORY ATTACK MITIGATION

(71) Applicant: NVIDIA Corporation, Santa Clara, CA (US)

(72) Inventors: Aamer Jaleel, Northborough, MA (US); Gururaj Saileshwar, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 258 days.

(21) Appl. No.: 18/545,845

(22) Filed: Dec. 19, 2023

(65) Prior Publication Data

US 2024/0403417 A1    Dec. 5, 2024

Related U.S. Application Data

(60) Provisional application No. 63/471,224, filed on Jun. 5, 2023.

(51) Int. Cl.
*G06F 21/55*        (2013.01)
*G06F 12/14*        (2006.01)
        (Continued)

(52) U.S. Cl.
CPC ........ *G06F 21/554* (2013.01); *G06F 12/1458* (2013.01); *G06F 21/52* (2013.01);
        (Continued)

(58) Field of Classification Search
CPC .... G06F 21/554; G06F 12/1458; G06F 21/52; G06F 21/79; G06F 12/145;
        (Continued)

(56) References Cited

U.S. PATENT DOCUMENTS 11,152,050 B2 * 10/2021 Morohashi .......... G11C 11/4087
11,631,448 B1 * 4/2023 Lee ................... G11C 11/40603
                                                        711/106
(Continued)

FOREIGN PATENT DOCUMENTS

CN        116340094 A  *  6/2023    .......... G06F 11/3034
CN        117116319 A  * 11/2023    .......... G11C 11/406
DE  202017106508 U1 *  2/2018    .......... G06F 11/302

OTHER PUBLICATIONS

Machine translation of Liu, CN 117116319 A, pp. 1-2 (Year: 2023).*

(Continued)

*Primary Examiner* — Christopher A Revak
(74) *Attorney, Agent, or Firm* — Zilka-Kotab, P.C.

(57)                ABSTRACT

Rowhammer attacks, which are malicious processes that rapidly issue access requests to memory, can impose serious security threats including being used to tamper data, take control of entire systems, and even breach confidentiality. Current solutions to defend against these attacks are limited, as they typically employ a deterministic tracker to track the portions of memory accessed and to mitigate potential attacks accordingly. However, the deterministic nature of these trackers results in their own vulnerability. The present disclosure provides probabilistic tracker management for mitigation of rowhammer attacks and/or other memory attacks in which a row (or other defined portion of memory) is maliciously targeted to disturb contents of neighboring rows, which can prevent these types of attacks that otherwise take advantage of the determinism in prior used tracker designs.

35 Claims, 10 Drawing Sheets

(51) Int. Cl.
        *G06F 21/52*          (2013.01)
        *G06F 21/79*          (2013.01)
        *G11C 11/406*        (2006.01)
(52) U.S. Cl.
        CPC ............ *G06F 21/79* (2013.01); *G06F 12/145*
                (2013.01); *G06F 2212/1052* (2013.01); *G06F*
                *2221/034* (2013.01); *G11C 11/40615* (2013.01)
(58) Field of Classification Search
        CPC ....... G06F 2212/1052; G06F 2221/034; G06F
                        12/1441; G06F 2212/1032; G06F
                        2212/1041; G11C 11/40615
        See application file for complete search history.

(56)                    References Cited

U.S. PATENT DOCUMENTS

| 11,961,548 | B2 * | 4/2024 | Kim | ........................ | G11C 7/02 |
| 12,300,304 | B2 * | 5/2025 | Agarwal | ........... | G11C 11/40615 |
| 12,511,190 | B1 * | 12/2025 | Xu | ........................ | G06F 11/1064 |
| 2019/0278508 | A1 * | 9/2019 | Pepper | ................... | G06F 3/0652 |
| 2020/0089611 | A1 * | 3/2020 | Gandhi | ............... | G06F 12/0813 |
| 2024/0112722 | A1 * | 4/2024 | Brandl | .............. | G11C 11/40611 |
| 2024/0355375 | A1 * | 10/2024 | Joo | ....................... | G11C 11/406 |
| 2024/0428845 | A1 * | 12/2024 | Song | ................... | G11C 11/4072 |
| 2025/0078904 | A1 * | 3/2025 | Ayyapureddi | ...... | G11C 11/4085 |

OTHER PUBLICATIONS

Aweke et al., "ANVIL: Software-Based Protection Against Next-Generation Rowhammer Attacks," ASPLOS '16, Apr. 2016, 13 pages.
Bakiri, M., "Hardware Implementation of Pseudo Random Number Generator Based on Chaotic Iteration," Thesis, University of Bourgogne Franche-Comté, 2018, 140 pages.
Bennett et al., "Panopticon: A Complete In-DRAM Rowhammer Mitigation," Workshop on DRAM Security (DRAMSec), 2021, 7 pages, retrieved from https://dramsec.ethz.ch/papers/panopticon.pdf.
Brasser et al., "CAn't Touch This: Software-only Mitigation against Rowhammer Attacks targeting Kernel Memory," Proceedings of the 26th USENIX Security Symposium, Aug. 2017, pp. 117-130.
Cojocar et al., "Exploiting Correcting Codes: On the Effectiveness of ECC Memory Against Rowhammer Attacks," IEEE Symposium on Security and Privacy, 2019, pp. 55-71.
De Ridder et al., "SMASH: Synchronized Many-sided Rowhammer Attacks from JavaScript," SMASH: Synchronized Many-sided Rowhammer Attacks from JavaScript, Aug. 2021, pp. 1001-1018.
Fakhrzadehgan et al., "SafeGuard: Reducing the Security Risk from Row-Hammer via Low-Cost Integrity Protection," IEEE International Symposium on High Performance Computer Architecture (HPCA), 2022, 14 pages, retrieved from https://memlab.ece.gatech.edu/papers/HPCA_2022_1.pdf.
Frigo et al., "TRRespass: Exploiting the Many Sides of Target Row Refresh," IEEE Symposium on Security and Privacy, 2020, pp. 747-762.
Gruss et al., "Another Flip in the Wall of Rowhammer Defenses," IEEE Symposium on Security and Privacy, 2018, pp. 245-261.
Gruss et al., "Rowhammer.js: A Remote Software-Induced Fault Attack in JavaScript," International Conference on Detection of Intrusions and Malware, and Vulnerability Assessment, 2016, 21 pages, retrieved from https://www.semanticscholar.org/paper/Rowhammer.js%3A-A-Remote-Software-Induced-Fault-in-Gruss-Maurice/5f49e769c8eca94873dbb7f30387e33e9d36558e.
Hassan et al., "CROW: A Low-Cost Substrate for Improving DRAM Performance, Energy Efficiency, and Reliability," Proceedings of the 46th International Symposium on Computer Architecture (ISCA), 2019, pp. 1-14.
Hassan et al., "Uncovering In-DRAM RowHammer Protection Mechanisms: A New Methodology, Custom RowHammer Patterns, and Implications," MICRO-54: 54th Annual IEEE/ACM International Symposium on Microarchitecture, 2021, pp. 1-16.
Hong et al., "DSAC: Low-Cost Rowhammer Mitigation Using In-DRAM Stochastic and Approximate Counting Algorithm," arXiv, 2023, pp. 1-15, retrieved from https://arxiv.org/abs/2302.03591.
Jattke et al., "Blacksmith: Scalable Rowhammering in the Frequency Domain," IEEE Symposium on Security and Privacy (SP), 2022, 20 pages.
Juffinger et al., "CSI: Rowhammer—Cryptographic Security and Integrity against Rowhammer," in 2023 IEEE Symposium on Security and Privacy (SP), 2023, 17 pages, retrieved from https://gruss.cc/files/csirowhammer.pdf.
Kim et al., "Architectural Support for Mitigating Row Hammering in DRAM Memories," IEEE Computer Architecture Letters, vol. 14, No. 1, 2015, pp. 9-12.
Kim et al., "Revisiting RowHammer: An Experimental Analysis of Modern DRAM Devices and Mitigation Techniques," Proceedings of the ACM/IEEE 47th Annual International Symposium on Computer Architecture (ISCA), 2020, pp. 1-14, retrieved from https://people.inf.ethz.ch/omutlu/pub/Revisiting-RowHammer_isca20-FINAL-DO-NOT_DISTRIBUTE.pdf.
Kim et al., "Mithril: Cooperative Row Hammer Protection on Commodity DRAM Leveraging Managed Refresh," 2022 IEEE International Symposium on High-Performance Computer Architecture (HPCA), 2022, pp. 1-16, retrieved from https://arxiv.org/abs/2108.06703.
Kim et al., "Flipping Bits in Memory Without Accessing Them: An Experimental Study of DRAM Disturbance Errors," IEEE International Symposium on Computer Architecture (ISCA), 2014, pp. 1-12.
Kogler et al., "Half-Double: Hammering From the Next Row Over," Proceedings of the 31st USENIX Security Symposium, Aug. 2022, pp. 3801-3824.
Kwong et al., "Rambleed: Reading Bits in Memory Without Accessing Them," IEEE Symposium on Security and Privacy, 2020, pp. 695-711.
Lee et al., "TWiCe: Preventing Row-hammering by Exploiting Time Window Counters," IEEE International Symposium on Computer Architecture (ISCA), Jun. 2019, pp. 384-395.
Lowe-Power et al., "The gem5 Simulator: Version 20.0+," arXiv, 2020, 21 pages, retrieved from https://arxiv.org/abs/2007.03152.
Luo et al., "RowPress: Amplifying Read Disturbance in Modern DRAM Chips," Proceedings of the 50th Annual International Symposium on Computer Architecture, Jun. 2023, pp. 1-18.
Marazzi et al., "PROTRR: Principled yet Optimal In-DRAM Target Row Refresh," IEEE Symposium on Security and Privacy (SP), 2022, pp. 735-753.
Marazzi et al., "REGA: Scalable Rowhammer Mitigation with Refresh-Generating Activations," IEEE Symposium on Security and Privacy (SP), 2023, 19, pages, retrieved from https://comsec.ethz.ch/wp-content/files/rega_sp23.pdf.
Misra et al., "Finding Repeated Elements," Science of Computer Programming 2, 1982, pp. 143-152.
Park et al., "Graphene: Strong yet Lightweight Row Hammer Protection," 53rd Annual IEEE/ACM International Symposium on Microarchitecture (MICRO), 2020, pp. 1-13.
Qureshi et al., "Hydra: Enabling Low-Overhead Mitigation of Row-Hammer at Ultra-Low Thresholds via Hybrid Tracking," Proceedings of the 49th Annual International Symposium on Computer Architecture, Jun. 2022, 12 pages.
Qureshi et al., "Adaptive Insertion Policies for High Performance Caching," Proceedings of the 34th Annual International Symposium on Computer Architecture, Jun. 2007, 12 pages.
Saileshwar et al., "Randomized Row-Swap: Mitigating Row Hammer by Breaking Spatial Correlation between Aggressor and Victim Rows," Proceedings of the 27th ACM International Conference on Architectural Support for Programming Languages and Operating Systems, 2022, pp. 1056-1069.
Saxena et al., "PT-Guard: Integrity-Protected Page Tables to Defend Against Breakthrough Rowhammer Attacks," IEEE/IFIP International Conference on Dependable Systems and Networks (DSN), 2023, pp. 1-14, retrieved from https://memlab.ece.gatech.edu/papers/DSN_2023_1.pdf.

(56) References Cited

OTHER PUBLICATIONS

Saxena et al., "AQUA: Scalable Rowhammer Mitigation by Quarantining Aggressor Rows at Runtime," 55th IEEE/ACM International Symposium on Microarchitecture (Micro), 2022, 16 pages, retrieved from https://memlab.ece.gatech.edu/papers/MICRO_2022_1.pdf.

Seyedzadeh et al., "Mitigating Wordline Crosstalk using Adaptive Trees of Counters," International Symposium on Computer Architecture, Jun. 2018, pp. 1-12.

SPEC, "SPEC CPU 2017," SPEC, 2022, 3 pages, retrieved from https://www.spec.org/cpu2017/.

Van Der Veen et al., "Drammer: Deterministic Rowhammer Attacks on Mobile Platforms," ACM SIGSAC Conference on Computer and Communications Security, 2016, 15 pages.

Woo et al., "Scalable and Secure Row-Swap: Efficient and Safe Row Hammer Mitigation in Memory Systems," The 29th IEEE International Symposium on High-Performance Computer Architecture (HPCA), 2022, 17 pages, retrieved from https://arxiv.org/abs/2212.12613.

Yagliker et al., "BlockHammer: Preventing RowHammer at Low Cost by Blacklisting Rapidly-Accessed DRAM Rows," IEEE International Symposium on High-Performance Computer Architecture (HPCA), 2021, 15 pages, retrieved from https://ghose.cs.illinois.edu/papers/21hpca_blockhammer.pdf.

You et al., "MRLoc: Mitigating Row-hammering based on memory Locality," 2019 56th ACM/IEEE Design Automation Conference (DAC), 2019, 6 pages.

Zhang et al., "PThammer: Cross-User-Kernel-Boundary Rowhammer through Implicit Accesses," 53rd Annual IEEE/ACM International Symposium on Microarchitecture (Micro), 2020, pp. 28-41.

Kim et al., "A 1.1V 16Gb DDR5 DRAM with Probabilistic-Aggressor Tracking, Refresh-Management Functionality, Per-Row Hammer Tracking, a Multi-Step Precharge, and Core-Bias Modulation for Security and Reliability Enhancement," IEEE International Solid-State Circuits Conference, Session 28, Feb. 22, 2023, 3 pages.

Wi et al., "Shadow: Preventing Row Hammer in DRAM with Intra-Subarray Row Shuffling," IEEE International Symposium on High-Performance Computer Architecture (HPCA), 2023, pp. 333-346.

Son et al., "Making DRAM Stronger Against Row Hammering," Proceedings of the 54th Annual Design Automation Conference, Jun. 2017, pp. 1-6.

Seaborn et al., "Exploiting the DRAM rowhammer bug to gain kernel privileges," Project Zero blog, Mar. 9, 2015, 15 pages, retrieved from https://googleprojectzero.blogspot.com/2015/03/exploiting-dram-rowhammer-bug-to-gain.html.

* cited by examiner

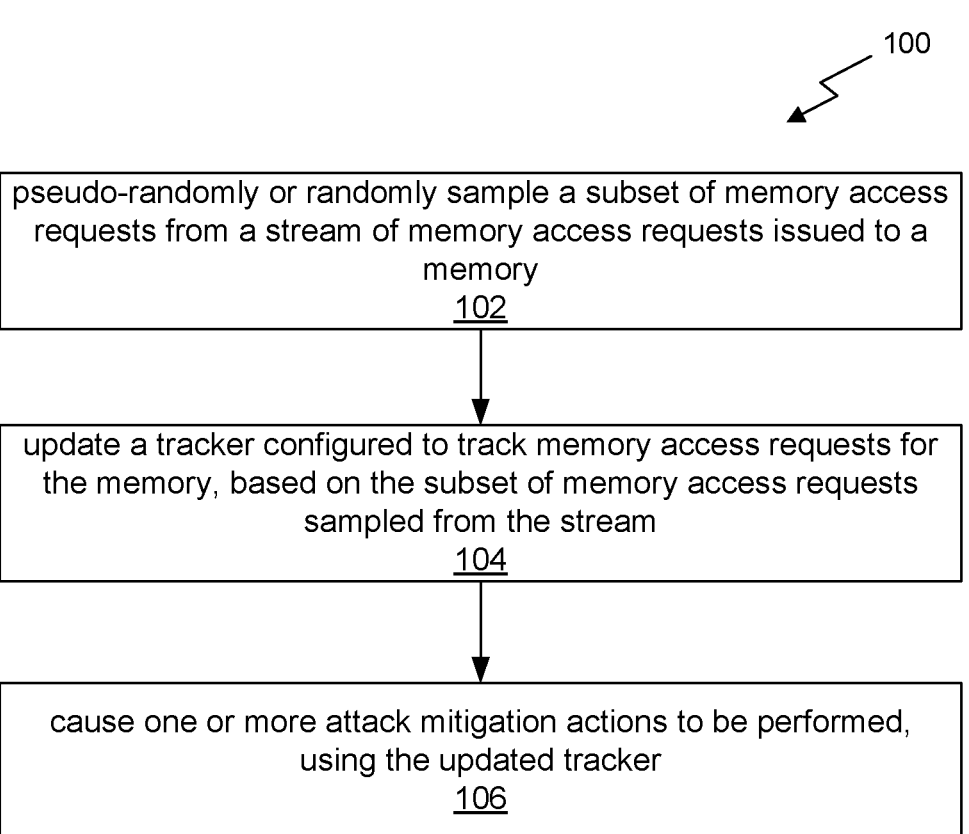

100 pseudo-randomly or randomly sample a subset of memory access requests from a stream of memory access requests issued to a memory
102 update a tracker configured to track memory access requests for the memory, based on the subset of memory access requests sampled from the stream
104 cause one or more attack mitigation actions to be performed, using the updated tracker
106

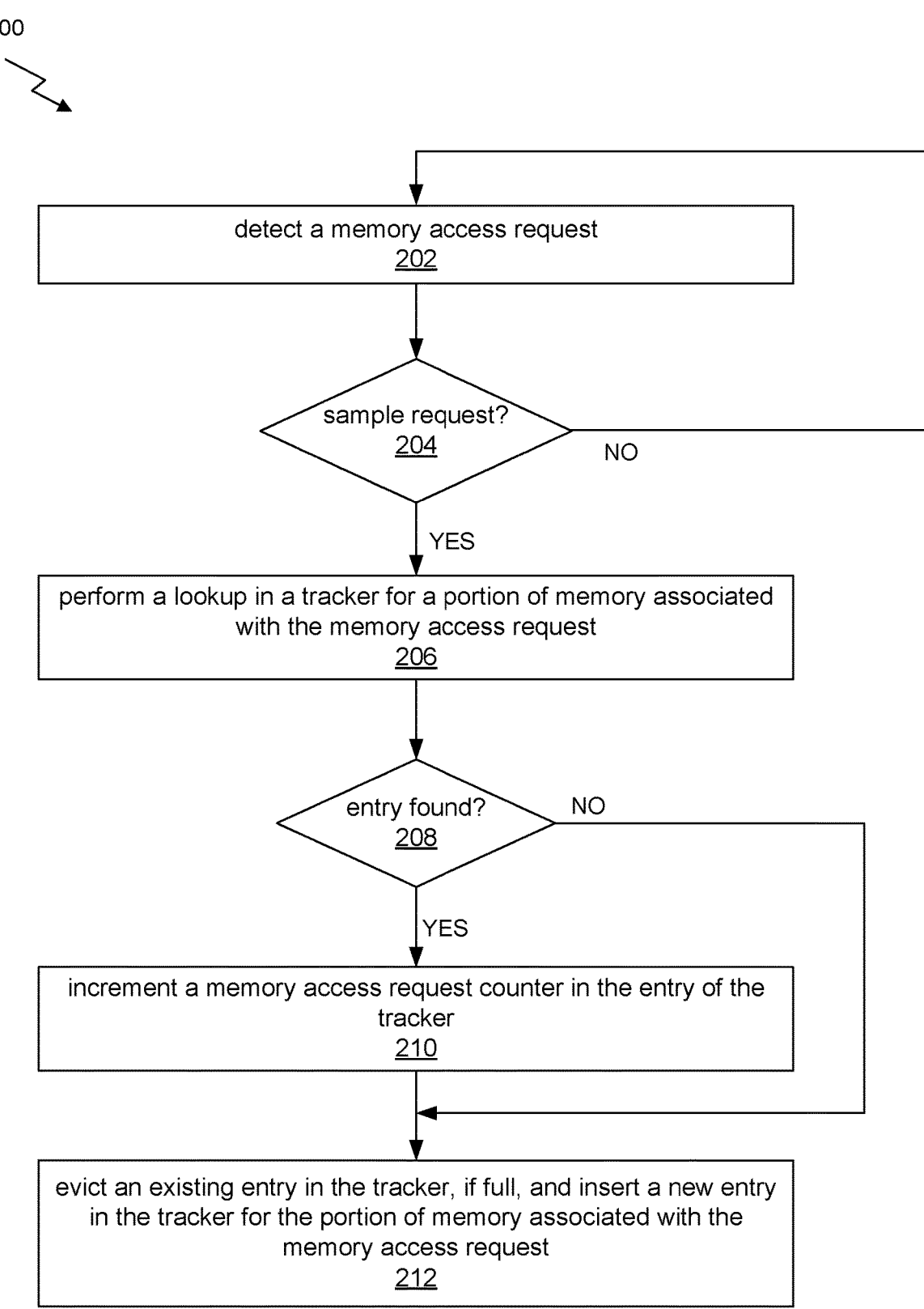

detect a memory access request
202 sample request?
204

NO

YES perform a lookup in a tracker for a portion of memory associated with the memory access request
206 entry found?
208

NO

YES increment a memory access request counter in the entry of the tracker
210 evict an existing entry in the tracker, if full, and insert a new entry in the tracker for the portion of memory associated with the memory access request
212

*Fig. 2A*

400
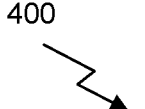
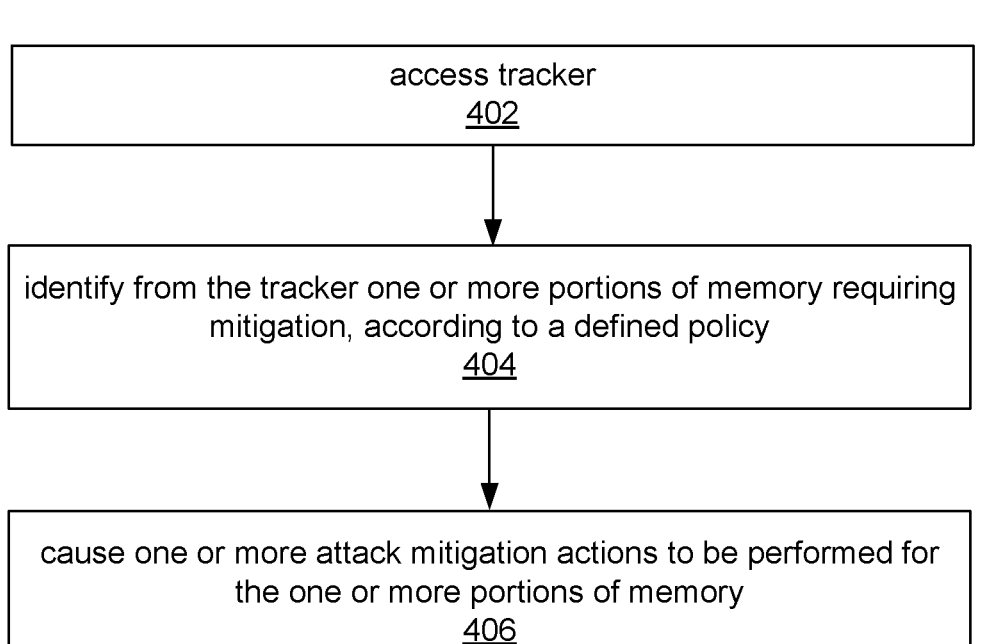
access tracker
402
identify from the tracker one or more portions of memory requiring
mitigation, according to a defined policy
404
cause one or more attack mitigation actions to be performed for
the one or more portions of memory
406
*Fig. 4*

800

804

SERVER

812

TELEVISION

808

PDA

814

816

SET-TOP BOX

NETWORK(S)

802

806

COMPUTER

810

MOBILE
TELEPHONE

GAME
CONSOLE

PROBABILISTIC TRACKER MANAGEMENT FOR MEMORY ATTACK MITIGATION

CLAIM OF PRIORITY

This application claims the benefit of U.S. Provisional Application No. 63/471,224 titled "PROBABILISTIC TRACKER MANAGEMENT POLICIES FOR MITIGATING ROWHAMMER ATTACKS," filed Jun. 5, 2023, the entire contents of which is incorporated herein by reference.

TECHNICAL FIELD

The present disclosure relates to hardware architectures and computer processes that address attacks on memory in which a row is maliciously targeted to disturb contents of neighboring rows, such as rowhammer and rowpress attacks.

BACKGROUND

Rowhammer attacks refer to malicious processes which rapidly issue access requests to memory. These attacks cause not only a memory reliability problem, but also impose serious security threats. For example, rowhammer attacks can be used to tamper data, take control of entire systems, and even breach confidentiality. In the case of a rowhammer attack on dynamic random access memory (DRAM) specifically, the rapid activations of one DRAM row can cause charge leakage and bit-flips in neighboring rows. As mentioned above, this not only affects reliability of the DRAM, but also opens up the computing system to various threats.

Unfortunately, state-of-the-art defenses to rowhammer attacks are limited. One such solution employed by DRAM manufacturers has been an in-DRAM mitigation called targeted row refresh (TRR) which relies on a tracking mechanism to identify rapidly activated rows or aggressor rows, and then issues a mitigative action by refreshing the neighboring victim rows. The tracker typically consists of a group of counters within each DRAM bank that counts row activations and issues mitigations in the background of regular refresh commands when they are issued to DRAM by the memory controller. However, limited capacity of in-DRAM trackers has made them significantly vulnerable to thrashing-based attacks which ensure aggressor rows are evicted from the tracker by activating a larger number of rows than the tracker capacity. Such thrashing-based attacks can continue to activate untracked rows far beyond the number of activations required to induce bit-flips (i.e. the "rowhammer threshold") without a mitigation, thus inducing Rowhammer bit-flips and rendering resource limited trackers such as TRR non-secure.

To avoid such thrashing-based attacks, other solutions have involved trackers with deterministic tracking algorithms, which require a larger number of counters. However, the required counters per bank increases as the rowhammer threshold decreases. Such high storage overheads make these solutions impractical, especially for in-DRAM adoption. Alternative solutions maintain one counter per row, requiring 8K to 16K counters per bank, but these counters are stored in memory and require additional DRAM accesses to fetch and update the counters, leading to high worst-case performance overheads of up to 70%. Further, storing them entirely within the DRAM array requires complex redesigns of the DRAM memory arrays (MATs), and consequently, such deterministic trackers requiring thousands of counters per bank have been difficult to adopt in commodity DRAM.

While trackerless solutions do exist which probabilistically issue mitigations to adjacent rows on activations while incurring no storage overhead, such solutions cannot be implemented transparently within the DRAM. They are required to be implemented only within the memory controller, as mitigative refresh commands cannot be issued by the DRAM transparently after any given activation. However, knowledge of neighboring DRAM rows is not always exposed to the memory controller by the DRAM manufacturer.

The issues noted above for rowhammer attacks are also relevant to other types of attacks on memory in which a row (or other defined portion of memory) is maliciously targeted to disturb contents of neighboring rows. For example, the above noted issues also apply to rowpress attacks where the malicious act is holding the row open for a long time.

There is a need for addressing these issues and/or other issues associated with the prior art. For example, there is a need to provide probabilistic tracker management for memory attack mitigation, which can prevent attacks that otherwise take advantage of the determinism in prior art tracker designs.

SUMMARY

A method, computer readable medium, and system are disclosed to probabilistic tracker management for memory attack mitigation. In an embodiment a method includes pseudo-randomly or randomly sampling a subset of memory access requests from a stream of memory access requests issued to a memory. The method also includes updating a tracker configured to track memory access requests for the memory, based on the subset of memory access requests sampled from the stream. The method further includes causing one or more mitigation actions to be performed, using the updated tracker.

In another embodiment, a memory includes a hardware buffer to track memory access requests that have been pseudo-randomly or randomly sampled from a stream of memory access requests issued to the memory. The memory also includes logic to perform one or more attack mitigation actions, using the hardware buffer.

In yet another embodiment, a memory controller that interfaces a memory includes a hardware buffer to track memory access requests that have been pseudo-randomly or randomly sampled from a stream of memory access requests issued to the memory. The memory controller also includes logic that uses the hardware buffer to cause the memory to perform one or more attack mitigation actions.

BRIEF DESCRIPTION OF THE DRAWINGS

FIG. 1 illustrates a flowchart of a method providing probabilistic tracker management for memory attack mitigation, in accordance with an embodiment.

FIGS. 2A-B illustrate methods of updating a tracker, in accordance with embodiments.

FIG. 4 illustrates a method for performing memory attack mitigation using a tracker, in accordance with an embodiment.

DETAILED DESCRIPTION

Figure 2B:
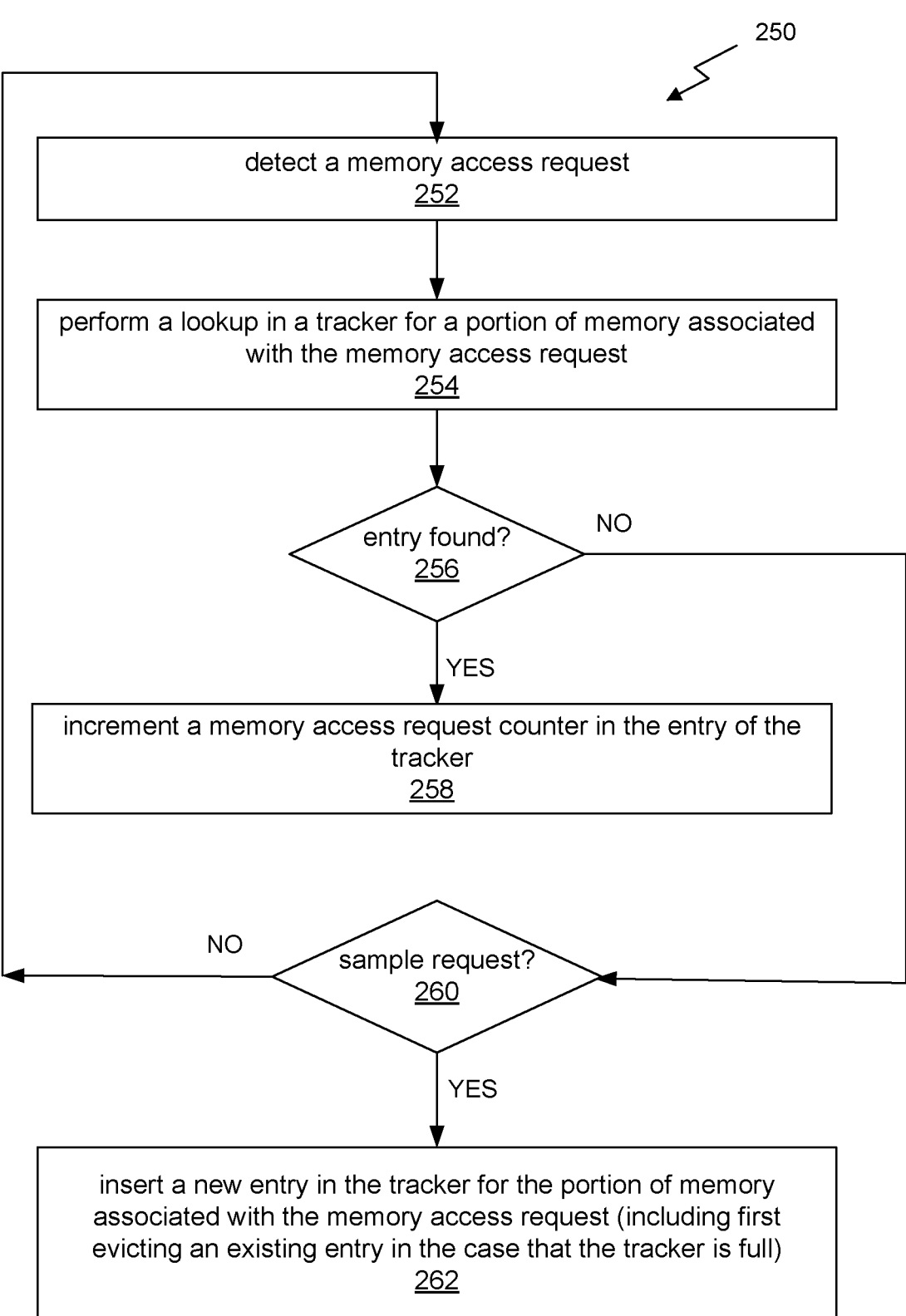

FIG. 1 illustrates a flowchart of a method 100 providing probabilistic tracker management for memory attack mitigation, in accordance with an embodiment. The method 100 may be performed by any device, such as a processing unit, a program, custom circuitry, or a combination thereof. For example, the method 100 may be executed by a GPU (graphics processing unit), CPU (central processing unit), or any processor described below. As another example, the method 100 may be performed in the context of the devices in the network architecture 800 of FIG. 8 and/or in the context of the system 900 of FIG. 9.

In one embodiment, the method 100 may be performed by a memory, such as DRAM. One example of a memory configured to perform the method 100 will be described in detail below with reference to FIG. 6. In another embodiment, the method 100 may be performed by a memory controller. One example of a memory controller configured to perform the method 100 will be described in detail below with reference to FIG. 7. Of course, persons of ordinary skill in the art will understand that any system that performs method 100 is within the scope and spirit of embodiments of the present disclosure.

As mentioned, the method 100, when performed, provides probabilistic tracker management for memory attack mitigation. In other words, a tracker, which is usable to track memory access requests for the purpose of mitigating memory attacks, is probabilistically managed. A memory attack refers to a malicious act in which a defined portion of memory (e.g. a row) is maliciously targeted to disturb contents of neighboring portions of memory (e.g. neighboring rows). For example, the memory attack may be a rowhammer attack in which a row is frequently accessed to disturb contents of its neighboring rows or a rowpress attack in which a row is held open for an extended period of time to disturb contents of its neighboring rows.

In the context of the present description, the tracker is a data structure that is configured to keep track of memory access requests issued to defined portions (e.g. rows) of a memory. In an embodiment, the tracker may store entries each indicating a different portion of the memory and a counter of a number of accesses made to the portion of the memory. In an embodiment, a size of the tracker (e.g. a maximum number of entries allowed to be stored in the tracker) may be preconfigured.

Returning to the method 100, in operation 102, a subset of memory access requests are pseudo-randomly or randomly sampled from a stream of memory access requests issued to a memory. The memory refers to any computer memory from which stored data can be accessed. In an embodiment, the memory may be DRAM. Of course, the memory may be any type of memory that is susceptible to a memory attack as defined above.

The stream of memory access requests refers to one or more requests to access the memory that have been issued over a period of time. Each of the memory access requests may specify a portion of the memory to be accessed. For example, each of the memory access requests may specify a row of the memory to be accessed, a particular address in the memory to be accessed, etc. In an embodiment, the stream of memory access requests may be generated by monitoring the memory access requests issued to the memory.

The memory may be accessed for reading data from the memory or writing data to the memory. The memory access requests may be issued by any source capable of issuing memory access requests, such as an application and/or operating system. The source(s) of the memory access request may be locally executing on a device having the memory or remotely executing with respect to the device having the memory.

As mentioned, a subset of memory access requests are pseudo-randomly or randomly sampled from the stream of memory access requests. In an embodiment, a pseudo-random-number generator (PRNG) may be used to select which of the memory access requests in the stream are sampled. In an embodiment, a seed of the PRNG may be a secret stored within the memory. In another embodiment, a subset of memory access requests are randomly sampled from the stream of memory access requests (i.e. with actual random sampling as opposed to the pseudo-random sampling). It should be noted that while various embodiments disclosed herein refer to "pseudo-random" sampling, it is contemplated that these embodiments may be configured with "random" sampling in other implementations.

In an embodiment, the subset of memory access requests may be sampled from all memory access requests issued to the memory. An example of this sampling method will be described below with reference to FIG. 2A. In another embodiment, the subset of memory access requests may be sampled from only a portion of such memory access requests. For example, the subset of memory access requests may be sampled from only those memory access requests that result in a miss when looked up in the tracker. An example of this sampling method will be described below with reference to FIG. 2B.

In an embodiment, a number of memory access requests included in the subset may be preconfigured. For example, over a preconfigured period of time, only the preconfigured number of memory access requests may be sampled from the stream. In an embodiment, a rate at which the stream is sampled may be static. For example, the rate at which the stream is sampled may be configured to match a rate at which memory refreshes are issued to update a state of the memory. In another embodiment, the rate at which the attack mitigation actions are performed may be dynamic or the rate at which the tracker is updated may be dynamic. The attack mitigation actions will be described in more detail below.

In operation 104, the tracker, which as mentioned above is configured to track memory access requests for the memory, is updated based on the subset of memory access requests sampled from the stream. In particular, the tracker may be updated to reflect, or record, that the subset of memory access requests have been issued to the memory. In this way, the tracker may be updated with the subset of memory access requests for the purpose of tracking such memory access requests.

In an embodiment, updating the tracker may include, for each memory access request in the subset, determining whether the tracker includes an existing entry tracking accesses for a portion of the memory associated with the memory access request. Further to this embodiment, when the tracker includes the existing entry for the portion of the memory associated with the memory access request, an access counter included in the existing entry may be updated (e.g. incremented). On the other hand, when the tracker does not include the existing entry for the portion of the memory associated with the memory access request, a new entry tracking accesses for another portion of the memory may be inserted in the tracker for the portion of the memory associated with the memory access request.

In an embodiment where the tracker is occupied above a threshold or full with existing entries but the new entry is to be inserted, then an existing entry may be evicted from the tracker. In an embodiment, the existing entry evicted from the tracker may be selected randomly for eviction. This random eviction policy may enhance the probabilistic nature of the tracker by randomizing replacement of entries within the tracker, while also ensuring that the portions of the memory that are tracked in the tracker are diverse (and in turn that any mitigations performed, as described below, are made to diverse portions of the memory). In another embodiment, the existing entry evicted from the tracker may be a least frequency used (LFU) entry or a least recently used (LRU) entry included in the tracker. If course, the existing entry may be evicted as a function of the access counter included in the tracker.

In operation 106, one or more attack mitigation actions are caused to be performed, using the updated tracker. In the context of the present description, an attack mitigation action refers to a computer function or process that is executed to mitigate a potential memory attack. As mentioned above, in one embodiment the memory attack may be a rowhammer attack which may include an external process rapidly activating a portion of memory, such as a row in the memory (called "rowhammer"), which can cause charge leakage and bit flips in neighboring rows. The heavily activated portion of memory may be referred to as an "aggressor" row, and the neighboring row with a bit-flip may be referred to as the "victim" row. During a rowhammer attack, these bit flips can occur up to a certain distance of rows from the aggressor rows (also known as the "blast-radius", which can be up to 2 rows from the aggressor row for example). In another embodiment, the memory attack may be a rowpress attack which may include an external process holding a portion of memory open, such as a row in the memory (call "rowpress"), which can likewise maliciously affect neighboring portions of memory.

In an embodiment, an attack mitigation action, or in other words an action to mitigate a potential memory attack, may include refreshing a portion of the memory. In an embodiment, the refresh may include reading data stored in the portion of the memory and then subsequently rewriting the read data back to the same portion of the memory (i.e. without modification of the data).

In an embodiment, causing the one or more attack mitigation actions to be performed, using the updated tracker, may include selecting (e.g. identifying, determining, etc.), based on the updated tracker, one or more portions of the memory on which to perform the one or more rowhammer mitigation actions. In an embodiment, at least one entry in the tracker may be identified. In an embodiment, the entry (ies) may be identified in accordance with a policy. The policy may indicate that a certain number of entries are to be identified from the tracker. The policy may indicate that a certain number of entries corresponding to the most frequently used (MFU) portions of memory are to be identified from the tracker, that a certain number of entries corresponding to random portions of memory are to be identified from the tracker, that a certain number of entries corresponding to the most recently used (MRU) portions of memory are to be identified from the tracker, that a certain number of entries corresponding to the oldest entries are to be identified from the tracker, or any other criteria by which one or more entries are capable of being identified from the tracker. The policy may indicate that the attack mitigation actions are to be performed on the portions of memory corresponding to the entries identified from the tracker. The policy may indicate that the attack mitigation actions are to be performed on portions of memory that neighbor (in the memory) the aforementioned portions of memory corresponding to the entries identified from the tracker (e.g. those neighbors within the blast-radius).

In an embodiment, the one or more attack mitigation actions may be caused to be performed by issuing a command to perform the row attack hammer mitigation action(s) on the selected portions of the memory. Thus, the command may indicate the portion(s) of the memory on which the attack mitigation actions is to be performed. In an embodiment, a memory controller may be caused to perform the attack mitigation action(s).

In an embodiment, the method 100 may be performed at least once during each of a plurality of memory refresh periods. The memory refresh periods may be preconfigured for the memory. A memory refresh period refers to a period of time that initiates after a periodic refresh of the memory and concludes following the next periodic refresh of the memory. The period refresh involves refresh of one or more portions of the memory, and in the present context may involve refresh via the rowhammer mitigation action(s).

In an embodiment, the method 100 may be performed once during each memory refresh period such that a single attack mitigation action may be performed (i.e. for each of the selected portion(s) of memory) during the memory refresh period. In another embodiment, the method 100 may be performed two or more times during the memory refresh period such that two or more corresponding attack mitigation actions may be performed during the memory refresh period.

To this end, the method 100 may be performed as described above to manage the tracker probabilistically (i.e. non-deterministically) for memory attack mitigation. This probabilistic management is ensured by causing the tracker to track memory access requests pseudo-randomly or randomly. In turn, the attacks that could otherwise take advantage of a deterministic tracker design (e.g. a tracker that tracks all memory access requests) may be thwarted.

Moreover, as mentioned, the method 100 is performed in one embodiment to mitigate rowhammer attacks. Rowhammer is not only a reliability issue but is also a critical security threat. In particular, rowhammer bit-flips in memory (e.g. page-tables or sensitive binaries) can be used by attackers to escalate to kernel-level privileges. In addition, the data-dependent nature of the bit-flips can be used to leak confidential data in the memory. Thus, the method 100 may imperatively reduce the risk of rowhammer attacks via the mitigation actions described herein. Likewise, the method 100 may also reduce the risk of other memory attacks as defined above.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIGS. 2A-B illustrate methods 200, 250 of updating a tracker, in accordance with embodiments. The methods 200, 250 describe possible implementations of operations 102-104 of the method 100 of FIG. 1. The definitions and descriptions given above may therefore equally apply to the present embodiments.

Typical tracker insertion policies insert all missing entries into the tracker. A memory access request is considered to have a "missing entry" when the tracker does not store a corresponding entry for the portion of memory associated with the memory access request. Thus, when any issued memory access request is determined to have a "missing entry," a typical tracker insertion policy will insert a new entry to the tracker for the corresponding portion of memory.

However, when the tracker is full, an eviction policy must also be used to select a suitable entry to evict in order free up space for the insertion of the new entry. Consequently, when the memory access pattern has a footprint that is larger than the tracker size, the tracker starts thrashing.

The methods 200, 250 aim to prevent thrashing based attacks from being able to fool the tracker by deterministically evicting tracked entries. The methods 200, 250 provide different implementations of probabilistic sampling of insertions to the tracker, which aims to reduce the number of insertions and to randomize those insertions, which in turn limits the thrashing capability of an attack.

At the same time, the probabilistic sampling decisions may be based on a pseudo-random-number generator (PRNG), whose seed is a secret (e.g. stored within the memory) and not known to the attacker, so the attacker may not surgically avoid sampling into the tracker. Moreover, the seed can be changed periodically, to prevent an attacker from reverse-engineering the sequence. Intuitively, sampling to limit insertions can be implemented either at the Miss Stream or Request Stream, both of which are described below.

FIG. 2A illustrates in particular a method 200 of updating a tracker with memory access requests pseudo-randomly sampled from a memory access request stream. The method 200 may be referred to as using Probabilistic Request Stream Sampling (PRSS) for updating the tracker.

In operation 202, a memory access request is detected. The memory access request is detected from the memory access request stream. Accordingly, the memory access request may be detected when it is issued to the memory.

In decision 204, it is determined whether to sample the memory access request. In an embodiment, the PRNG may be used to determine whether to sample the memory access request. When it is determined in decision 204 to not sample the memory access request, the method 200 returns to operation 202 to detect a next memory access request.

On the other hand, when it is determined in decision 204 to sample the memory access request, a lookup is performed in the tracker for a portion of memory associated with the memory access request (see operation 206). The portion of memory associated with the memory access request refers to the portion of memory requested to be accessed in the memory access request. For example, the memory access request may include an identifier (e.g. memory row address) of the portion of memory for which access is being requested, and the lookup may be performed using that identifier.

In decision 208 it is determined whether an entry in the tracker is found as a result of the lookup. For example, a "hit" may occur when an entry in the tracker is found for the portion of memory associated with the memory access request. However, a "miss" may occur when an entry in the tracker is not found for the portion of memory associated with the memory access request.

When it is determined in decision 208 that an entry in the tracker is found, a memory access request counter in the entry of the tracker is incremented (see operation 210). In an embodiment, the counter may be incremented by adding the value "1" to a current value of the counter. Of course, however, the counter may be updated in accordance with any defined function.

When it is determined in decision 208 that an entry in the tracker is not found, then an existing entry in the tracker is evicted, if the tracker is full, and a new entry is inserted in the tracker for the portion of memory associated with the memory access request (see operation 212). The existing entry may be selected for eviction in accordance with a preconfigured eviction policy. The preconfigured eviction policy may indicate to evict a randomly selected entry or a LFU entry, for example. The new entry may be inserted with a default counter value (e.g. "0"), which may in turn be incremented for each subsequently received memory access request directed toward the same portion of memory.

To this end, the method 200 limits potential thrashing by probabilistically sampling the request stream and only using a subset of the memory access requests (i.e. activations) to consult the tracker. PRSS may use a sampling probability p, based on a PRNG, to select a subset of the requests to lookup the tracker. In an embodiment, a sampling rate may be configured to ensure at least one insertion per memory refresh period. In an embodiment, frequently accessed portions of memory will have a higher chance of being sampled. In accordance with the method 200, only the sampled memory access requests will be used to update the tracker on hits or can cause insertion into the tracker on misses, while the non-sampled memory access requests bypass the tracker.

FIG. 2B illustrates a method 250 of updating a tracker with memory access requests pseudo-randomly sampled from those that do not already have corresponding entries in the tracker (i.e. those that have caused a "miss" when looked up in the tracker). The method 250 may be referred to as using Probabilistic Miss Stream Sampling (PMSS) to update the tracker.

In operation 252, a memory access request is detected. The memory access request is detected from the memory access request stream. Accordingly, the memory access request may be detected when it is issued to the memory.

In operation 254, a lookup is performed in the tracker for a portion of memory associated with the memory access request. The portion of memory associated with the memory access request refers to the portion of memory requested to be accessed in the memory access request. For example, the memory access request may include an identifier (e.g. memory row) of the portion of memory for which access is being requested, and the lookup may be performed using that identifier.

In decision 256 it is determined whether an entry in the tracker is found as a result of the lookup. For example, a "hit" may occur when an entry in the tracker is found for the portion of memory associated with the memory access request. However, a "miss" may occur when an entry in the tracker is not found for the portion of memory associated with the memory access request.

When it is determined in decision 256 that an entry in the tracker is found, a memory access request counter in the entry of the tracker is incremented (see operation 258). In an embodiment, the counter may be incremented by adding the value "1" to a current value of the counter. Of course, however, the counter may be updated in accordance with any defined function.

When it is determined in decision 256 that an entry in the tracker is not found, then it is determined in decision 260 whether to sample the memory access request. In an embodiment, the PRNG may be used to determine whether to sample the memory access request. When it is determined in decision 260 to not sample the memory access request, the method 250 returns to operation 252 to detect a next memory access request.

On the other hand, when it is determined in decision 260 to sample the memory access request, then a new entry is inserted in the tracker for the portion of memory associated with the memory access request (including first evicting an existing entry in the tracker in the case that the tracker is full) (see operation 262). The existing entry may be selected for eviction in accordance with a preconfigured eviction policy. The preconfigured eviction policy may indicate to evict a randomly selected entry or a LFU entry, for example.

Similarly to the method 200, this method 250 also limits thrashing. PMSS uses a PRNG with a sampling probability p to insert a subset of misses into the tracker. In an embodiment, a sampling rate may be configured to ensure at least one insertion per memory refresh period. In any case, the method 250 preserves a portion of the working set in the tracker, and intermittently stores new entries, thus allowing new untracked portions of memory to be tracked.

Figure 3:
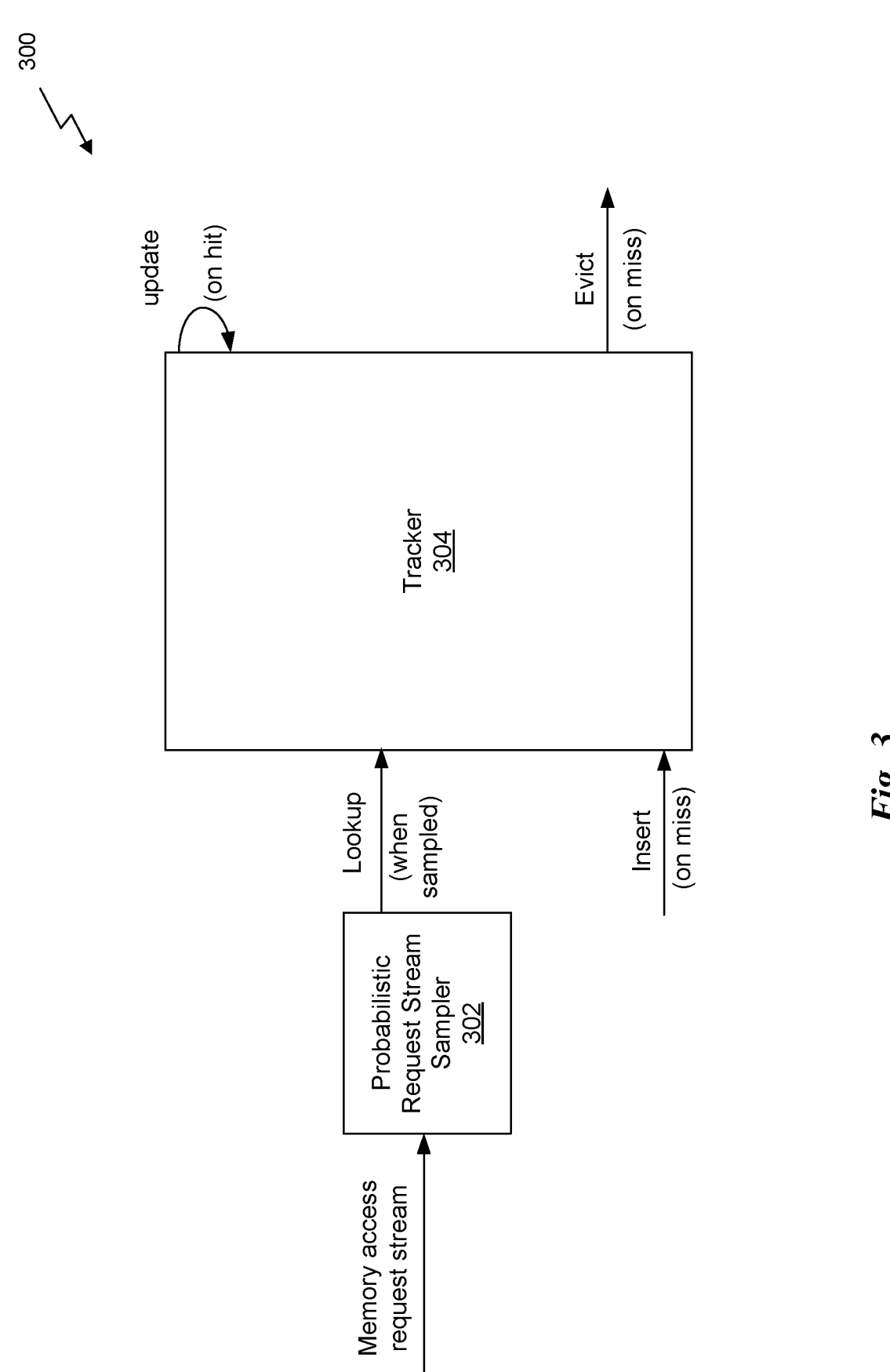
FIG. 3 illustrates a block diagram of a system for updating a tracker, in accordance with an embodiment.

FIG. 3 illustrates a block diagram of a system 300 for updating a tracker, in accordance with an embodiment. In the present embodiment, the system 300 uses PRSS for updating the tracker, as described above in FIG. 2A.

As shown, a memory access request stream is input to a probabilistic request stream sampler 302. The probabilistic request stream sampler 302 includes, or uses, a PRNG to select which of the memory access requests in the stream to sample for updating a tracker 304. For each sampled memory access request, the probabilistic request stream sampler 302 causes a lookup to be performed in the tracker 304 for a portion of memory associated with the memory access request.

When an entry corresponding to the portion of memory exists in the tracker 304, such that the lookup results in a "hit", then a counter in the entry is updated (e.g. incremented) to reflect that the memory access request has been issued to the portion of memory. When an entry corresponding to the portion of memory does not already exist in the tracker 304, such that the lookup results in a "miss", then a new entry for the portion of memory is inserted into the tracker 304.

Insertion of the new entry to the tracker 304 may require eviction of an existing entry from the tracker 304, in particular when the tracker 304 is already full, in order to make room in the tracker 304 for the new entry. The eviction may be made in accordance with a defined eviction policy, such as a LFU policy where the entry with the lowest count is evicted.

FIG. 4 illustrates a method 400 for performing memory attack mitigation using a tracker, in accordance with an embodiment. The method 400 describes a possible implementation of operation 106 of the method 100 of FIG. 1. The method 400 may be performed one or more times during each memory refresh period. In an embodiment, the method 400 may be performed at a same rate as the rate that the memory access request stream is sampled (e.g. per method 200 of FIG. 2A or method 250 of FIG. 2B).

In operation 402, a tracker is accessed. The tracker probabilistically tracks memory access requests for a memory, for example in accordance with the method 100 of FIG. 1, the method 200 of FIG. 2A, or the method 250 of FIG. 2B. Accessing the tracker refers to making a connection with the tracker for the purpose of looking up data therein.

In operation 404, one or more portions of memory requiring mitigation are identified from the tracker, according to a defined policy. The policy refers to a mitigation policy that defines the criteria by which portions of memory requiring mitigation are identified. A portion of memory requiring mitigation refers to a portion of memory on which a mitigation action is to be performed.

In an embodiment, the policy may indicate that a certain number of entries meeting a certain criteria are to be identified from the tracker. The criteria may be that the entries are those that correspond to the MFU, MRU, LFU, random, oldest, etc. portions of memory. In an embodiment, the policy may indicate that the identified portions of memory require the mitigation. In an embodiment, the policy may indicate that additional portions of memory neighboring those identified portions of memory require the mitigation.

For example, the mitigation policy may select the entry in the tracker with a highest count for mitigation of its associated portion of memory. As another example, the mitigation policy may also select additional portions of memory neighboring that portion of memory (e.g. within a defined radius, referred to as the blast-radius).

In operation 406, one or more attack mitigation actions are caused to be performed for the one or more portions of memory requiring mitigation. In an embodiment, the attack mitigation actions may include refreshing each of the portions of memory. Thus, in an example, the MFU portions of memory as well as their neighboring portions of memory may be refreshed.

In an embodiment, once the mitigation actions are performed for the one or more portions of memory, the entries in the tracker corresponding to those portions of memory may be invalidated. Invalidating the entries may refer to removing the entries from the tracker. This invalidation may enable other (e.g. MFU) portions of the memory to receive mitigations during subsequent iterations of the method 400.

In an embodiment, the one or more attack mitigation actions may be caused to be performed by issuing a command to perform the attack mitigation action(s) on the selected portions of the memory. Thus, the command may indicate the portion(s) of the memory on which the attack mitigation actions is to be performed. In an embodiment, a memory controller may be caused to perform the attack mitigation action(s).

Figure 5:
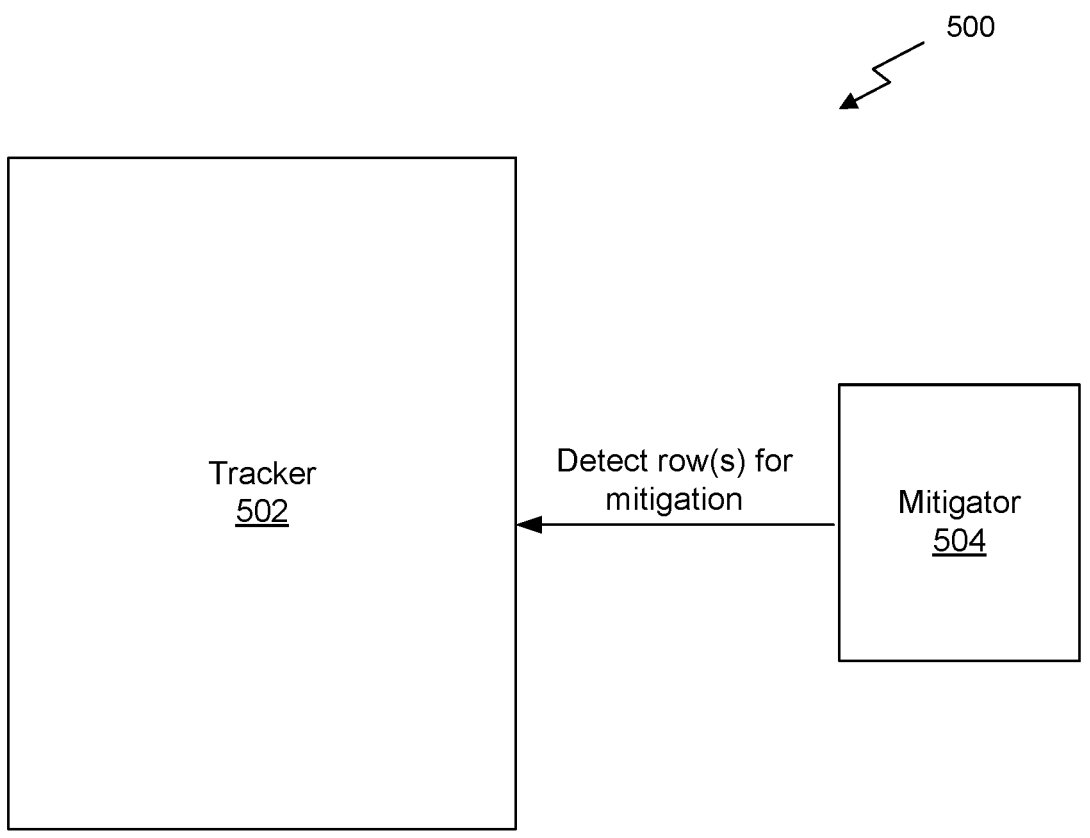
FIG. 5 illustrates a block diagram of a system for performing memory attack mitigation using a tracker, in accordance with an embodiment.

FIG. 5 illustrates a block diagram of a system 500 for performing attack mitigation using a tracker, in accordance with an embodiment. The system 500 may be implemented in the context of the method 100 of FIG. 1 and the method 400 of FIG. 4. The definitions and descriptions given above may therefore equally apply to the present embodiments.

As shown, a mitigator 504 interfaces with a tracker 502. The mitigator 504 refers to a computer program, computer process, or computer hardware that is configured to cause mitigations for potential attacks on a memory. The mitigator 504 and the tracker 502 may be located on a same device or different devices. In an embodiment, the mitigator 504 and the tracker 502 may be located on a memory. In another embodiment, the mitigator 504 and the tracker 502 may be located on a memory controller. In another embodiment, the tracker 502 may be located on a memory while the mitigator 504 may be located on a memory controller.

The mitigator 504 accesses the tracker 502 and identifies from the tracker one or more portions of memory requiring mitigation, which are referred to as "row(s)" in the present Figure. The mitigator 504 identifies the portions of memory requiring mitigation in accordance with a defined mitigation policy.

The mitigator 504 may lookup in the tracker a certain number of entries having a highest counter value, indicating that such entries correspond to the MFU portions of memory. Of course, other selection policies may be used in other embodiments, as described in prior embodiments above. The mitigator 504 may cause a mitigation action to be performed for those portions of memory. In an embodiment, the mitigator 504 may cause the memory to perform the mitigation action.

The mitigation action may include a refresh of the portions of memory. The mitigation action may also include a refresh of additional portions of the memory neighboring the portions of memory identified from the tracker 502. Performing the mitigation action on a portion of the memory may further cause the corresponding entry in the tracker 502 to be invalidated.

Figure 6:
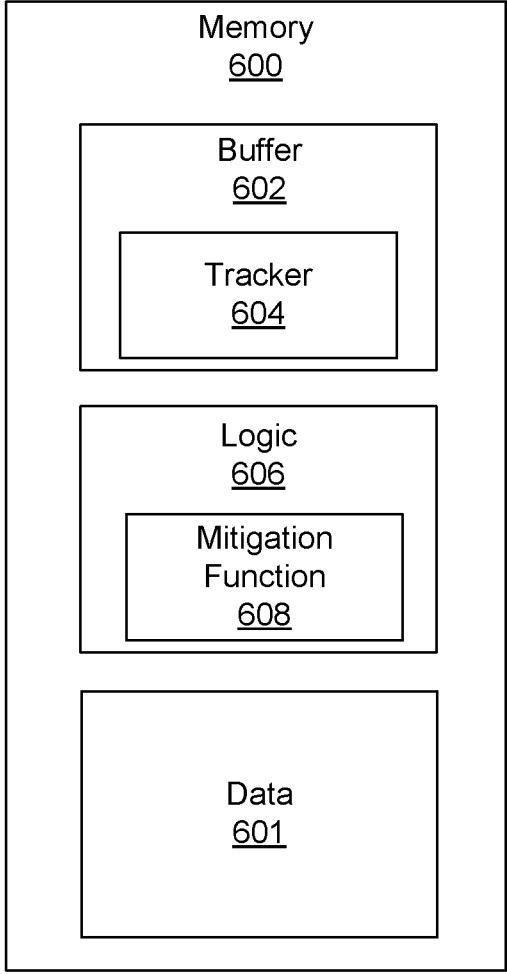
FIG. 6 illustrates a memory providing probabilistic tracker management for memory attack mitigation, in accordance with an embodiment.

FIG. 6 illustrates a memory 600 providing probabilistic tracker management for memory attack mitigation, in accordance with an embodiment. The memory 600 may be configured to carry out the method 100 of FIG. 1. In other embodiments, the memory 600 may be configured in accordance with of the other systems and methods described herein.

The memory 600 refers to a hardware device that is configured to store data 601 at least temporarily. In an embodiment, the memory 600 may be DRAM. In other embodiments, the memory may be any type of memory that is susceptible to a malicious act in which a defined portion of memory (e.g. a row) is maliciously targeted to disturb contents of neighboring portions of memory (e.g. neighboring rows). In an embodiment, the functionality described in the present embodiment may be supported by existing memory protocols.

The memory 600 includes a buffer 602, implemented in hardware, that includes, or operates as, a tracker 604. In particular, the tracker 604 is configured to track memory access requests that have been pseudo-randomly sampled from a stream of memory access requests issued to the memory 600, or pseudo-randomly sampled from those memory access requests that do not already have corresponding entries in the tracker 604. The memory access requests are requests to access the data 601. The pseudo-random sampling may be performed by the memory 600, in an embodiment. The pseudo-random sampling may be performed in accordance with a sampling policy accessible, or stored by, the memory 600, in an embodiment.

The memory 600 also includes logic 606 which itself includes at least one mitigation function 608. The mitigation function 608 may therefore be implemented in hardware. The logic 606 operates to perform one or more attack mitigation actions via the mitigation function 608, using the tracker 604. In an embodiment, the logic 606 selects, based on the tracker 604, one or more portions of the memory 600, an in particular one or more portions of the memory 600 storing the data 601, on which to perform the one or more attack mitigation actions, and further performs the one or more attack mitigation actions on the one or more portions of the memory 600.

In an embodiment, the one or more portions of the memory 600 on which the mitigation actions are performed may be neighbors to at least one portion of the memory 600 identified from the tracker 604 in accordance with a policy. The policy may be to identify a preconfigured number of MFU portions of the memory 600, in an exemplary embodiment. The mitigation actions may be to refresh the MFU (or other identified) portions of the memory 600 and the neighbors to those portions of the memory 600.

The memory 600 may be configured with a plurality of refresh periods. In an embodiment, the memory 600 may be configured to perform the pseudo-random sampling and the mitigations one time during each refresh period. In another embodiment, the memory 600 may be configured to perform the pseudo-random sampling and the mitigations two or more times during each refresh period.

Figure 7:
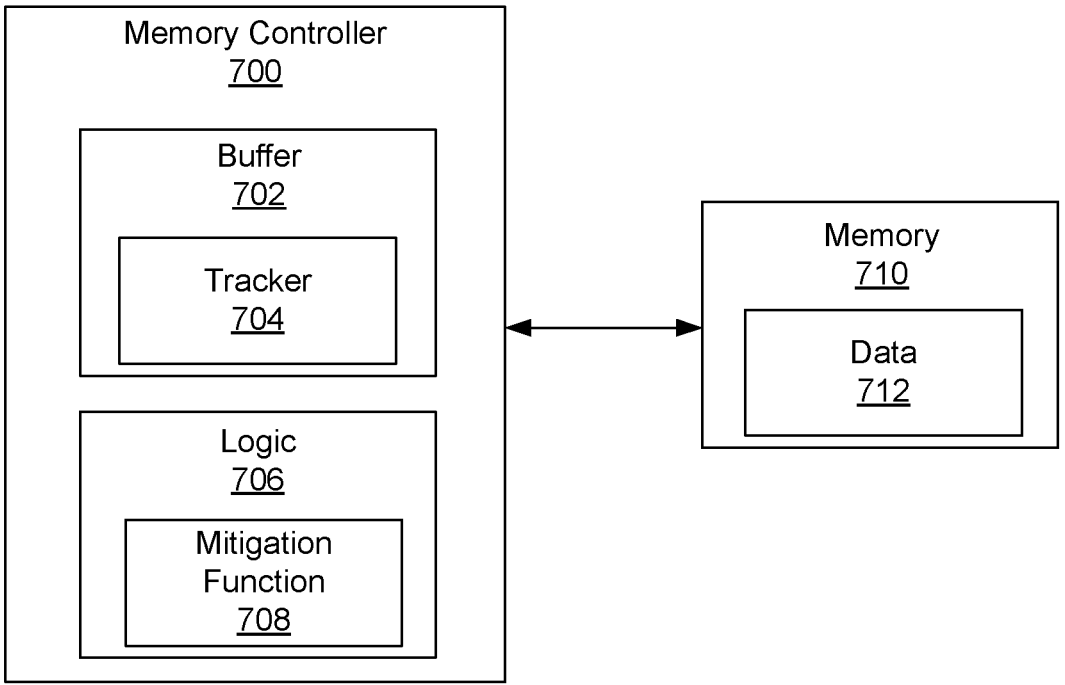
FIG. 7 illustrates a memory controller to provide probabilistic tracker management for memory attack mitigation, in accordance with an embodiment.

FIG. 7 illustrates a memory controller 700 to provide probabilistic tracker management for rowhammer attack mitigation, in accordance with an embodiment. The memory controller 700 may be configured to carry out the method 100 of FIG. 1. In other embodiments, the memory controller 700 may be configured in accordance with of the other systems and methods described herein.

As shown, the memory controller 700 interfaces a memory 710. The memory 710 refers to a hardware device that is configured to store data 712 at least temporarily. The memory 710 may be DRAM or any other type of memory that is susceptible to a malicious act in which a defined portion of memory (e.g. a row) is maliciously targeted to disturb contents of neighboring portions of memory (e.g. neighboring rows). Memory access requests may be issued to the memory 710 through the memory controller 700, in an embodiment.

The memory controller 700 includes a buffer 702, which may be implemented in software or in static random access memory (SRAM), that includes, or operates as, a tracker 704. In particular, the tracker 704 is configured to track memory access requests that have been pseudo-randomly sampled from a stream of memory access requests issued to the memory 710, or pseudo-randomly sampled from those memory access requests that do not already have corresponding entries in the tracker 704. The memory access requests are requests to access the data 712. The pseudo-random sampling may be performed by the memory controller 700, in an embodiment. The pseudo-random sampling may be performed in accordance with a sampling policy accessible, or stored by, the memory controller 700, in an embodiment.

The memory controller 700 also includes logic 706 which itself includes at least one mitigation function 708. The mitigation function 708 may be implemented in software. The logic 706 operates to perform one or more attack mitigation actions via the mitigation function 708, using the tracker 704. In an embodiment, the logic 706 selects, based on the tracker 704, one or more portions of the memory 710, an in particular one or more portions of the memory 710 storing the data 712, on which to perform the one or more attack mitigation actions, and further causes the one or more attack mitigation actions to be performed on the one or more portions of the memory 710.

In an embodiment, the one or more portions of the memory 710 on which the mitigation actions are performed may be neighbors to at least one portion of the memory 710 identified from the tracker 704 in accordance with a policy. The policy may be to identify a preconfigured number of MFU portions of the memory 710, in an embodiment. The mitigation actions may be to refresh the MFU (or other identified) portions of the memory 710 and the neighbors to those portions of the memory 710.

In an embodiment, the memory controller 700 may cause the memory 710 to perform one or more attack mitigation actions by issuing a refresh management (RFM) command to the memory 710 that indicates one or more portions of the memory identified from the tracker 704 based on a policy. In this case, the memory 710 may be configured to respond to the RFM command by performing the one or more attack mitigation actions in association with the one or more portions of the memory 710 indicated in the RFM command. In an embodiment, the one or more attack mitigation actions may include refreshing one or more other portions of the memory that are neighbors to one or more portions of the memory indicated in the RFM command. In this way, even when a mapping of the data in the memory 710 is proprietary to the memory manufacturer (i.e. is not known by the memory controller 700), the memory controller 700 may simply issue the RFM command to the memory 710 as mentioned above and the memory 710 may handle accessing the required portions of memory for performing the attack mitigation actions.

The memory 710 may be configured with a plurality of refresh periods. In an embodiment, the memory controller 700 may be configured to perform the pseudo-random sampling and to cause the attack mitigations (e.g. via RFM command) one time during each refresh period. In another embodiment, the memory controller 700 may be configured to perform the pseudo-random sampling and to cause the attack mitigations (e.g. via RFM command) two or more times during each refresh period.

Figure 8:
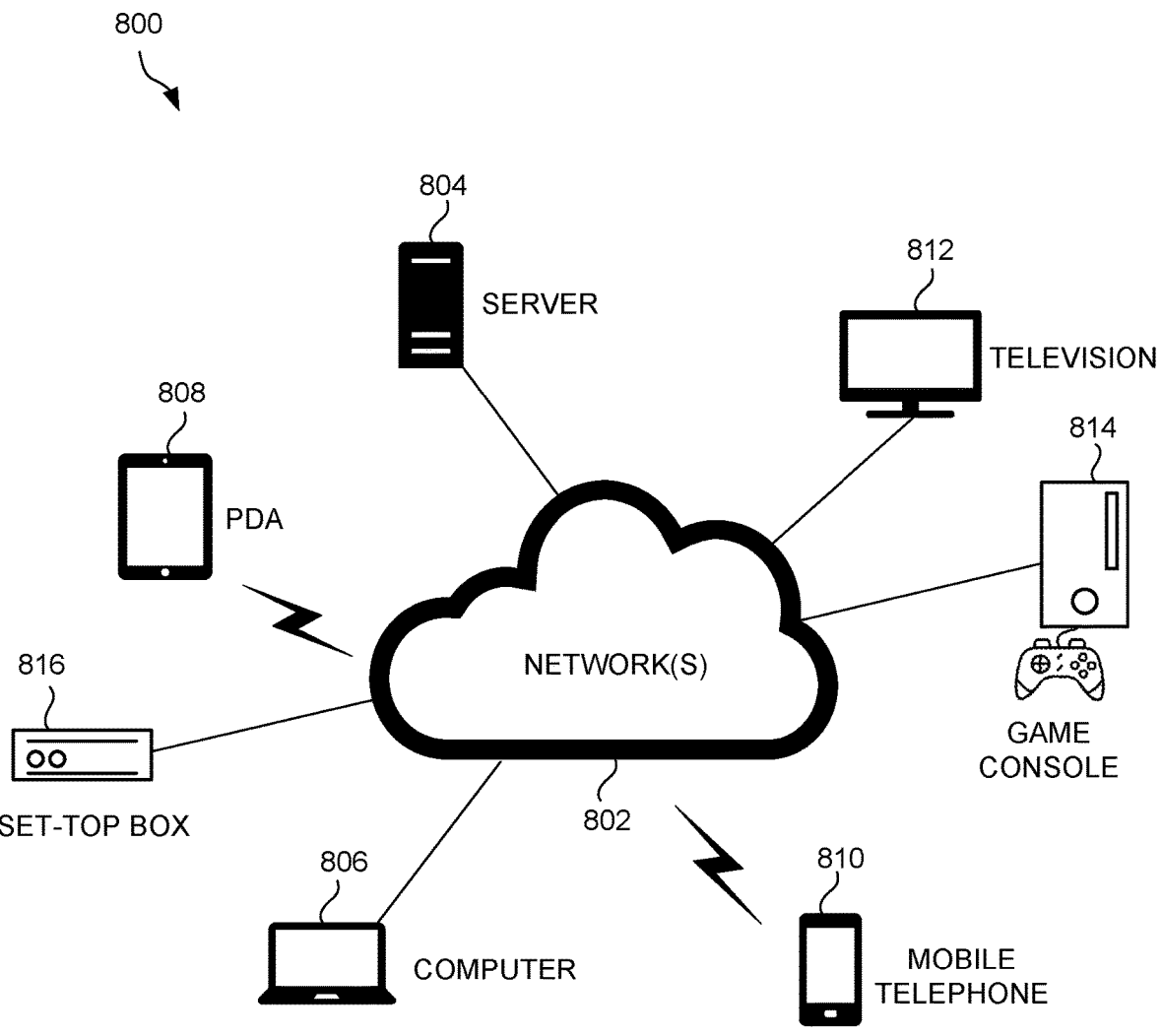
FIG. 8 illustrates a network architecture, in accordance with an embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, a game console 814, a television set-top box 816, etc.

Figure 9:
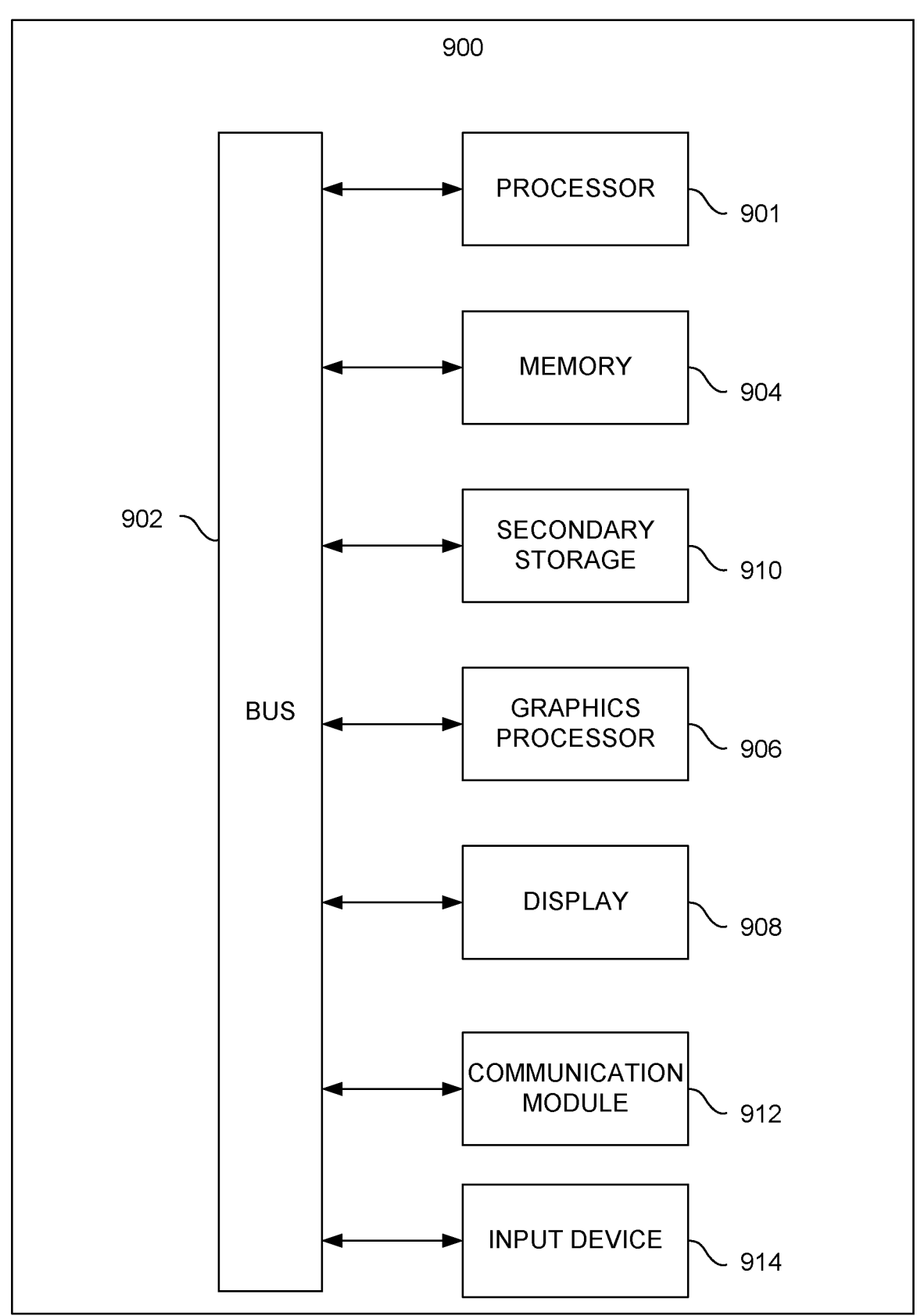
FIG. 9 illustrates an exemplary system, in accordance with an embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As also shown, the system 900 may include one or more input devices 914. The input devices 914 may be wired or wireless input device. In various embodiments, each input device 914 may include a keyboard, touch pad, touch screen, game controller (e.g. to a game console), remote controller (e.g. to a set-top box or television), or any other device capable of being used by a user to provide input to the system 900.

As described herein, a method, computer readable medium, and system are disclosed to provide probabilistic tracker management for memory attack mitigation. In accordance with FIGS. 1-7, embodiments may provide a probabilistic tracker for memory, which may in turn be used for mitigating memory attacks. The methods, memory, and/or associated memory controller may be implemented in the context of any of the devices depicted in FIGS. 8 and/or 9.

What is claimed is:

1. A method, comprising:

at a device:

pseudo-randomly or randomly sampling a subset of memory access requests from a stream of memory access requests issued to a memory; and updating a data structure configured to track memory access requests for the memory, based on the subset of memory access requests sampled from the stream, wherein updating the data structure includes, for each memory access request in the subset of memory access requests:

determining whether the data structure includes an existing entry tracking accesses for a portion of the memory associated with the memory access request;

when the data structure includes the existing entry for the portion of the memory associated with the memory access request, updating an access counter included in the existing entry; and when the data structure does not include the existing entry for the portion of the memory associated with the memory access request:

when the data structure is occupied above a threshold or is full, evicting from the data structure an existing entry tracking accesses for another portion of the memory, and inserting a new entry in the data structure for the portion of the memory associated with the memory access request;

causing one or more attack mitigation actions to be performed, using the updated data structure.

2. The method of claim 1, wherein the memory is dynamic random access memory (DRAM).

3. The method of claim 1, wherein the stream of memory access requests is generated by monitoring the memory access requests access issued to the memory.

4. The method of claim 1, wherein a number of memory access requests included in the subset is preconfigured.

5. The method of claim 1, wherein a rate at which the stream is sampled is static.

6. The method of claim 5, wherein the rate at which the stream is sampled matches a rate at which memory refreshes are issued to update a state of the memory.

7. The method of claim 1, wherein the rate at which the data structure is updated matches a rate at which memory refreshes are issued to update a state of the memory.

8. The method of claim 7, wherein the rate at which the attack mitigation actions are performed is dynamic.

9. The method of claim 1, wherein the data structure stores a plurality of entries each indicating a different portion of the memory and a counter of a number of accesses made to the portion of the memory.

10. The method of claim 9, wherein a size of the data structure is preconfigured.

11. The method of claim 9, wherein each portion of the memory is a row in the memory.

12. The method of claim 1, wherein the existing entry evicted from the data structure is selected randomly.

13. The method of claim 1, wherein the existing entry evicted from the data structure is a function of the access counter included in the data structure.

14. The method of claim 1, wherein causing the one or more attack mitigation actions to be performed, using the updated data structure, includes:

selecting, based on the updated data structure, one or more portions of the memory on which to perform the one or more attack mitigation actions.

15. The method of claim 14, wherein the one or more portions of the memory are neighbors to at least one portion of the memory identified from the updated data structure in accordance with a policy.

16. The method of claim 15, wherein the at least one portion of the memory identified from the updated data structure in accordance with a policy includes a preconfigured number of portions of the memory.

17. The method of claim 16, wherein the policy is to identify the preconfigured number of most frequently used (MFU) portions of memory.

18. The method of claim 14, wherein the one or more attack mitigation actions include refreshing the one or more portions of the memory.

19. The method of claim 1, wherein the method is performed at least once during each memory refresh period.

20. The method of claim 19, wherein the one or more attack mitigation actions are a single attack mitigation action performed during the memory refresh period.

21. The method of claim 19, wherein one or more attack mitigation actions are two or more attack mitigation actions performed during the memory refresh period.

22. The method of claim 1, wherein the one or more attack mitigation actions are performed to mitigate rowhammer attacks.

23. The method of claim 1, wherein the one or more attack mitigation actions are performed to mitigate rowpress attacks.

24. The method of claim 1, wherein the device is the memory.

25. The method of claim 1, wherein the device is a memory controller.

26. A memory, comprising:

a hardware buffer to track memory access requests that have been pseudo-randomly or randomly sampled from a stream of memory access requests issued to the memory; and logic to:

(a) update the hardware buffer based on the memory access requests sampled from the stream including, for each of the memory access requests:

determining whether the hardware buffer includes an existing entry tracking accesses for a portion of the memory associated with the memory access request;

when the hardware buffer includes the existing entry for the portion of the memory associated with the memory access request, updating an access counter included in the existing entry; and when the hardware buffer does not include the existing entry for the portion of the memory associated with the memory access request:

when the hardware buffer is occupied above a threshold or is full, evicting from the hardware buffer an existing entry tracking accesses for another portion of the memory, and inserting a new entry in the hardware buffer for the portion of the memory associated with the memory access request, and (b) perform one or more attack mitigation actions, using the updated hardware buffer.

27. The memory of claim 26, wherein the memory is DRAM.

28. The memory of claim 26, wherein the logic:

selects, based on the updated hardware buffer, one or more portions of the memory on which to perform the one or more attack mitigation actions, and performs the one or more attack mitigation actions on the one or more portions of the memory.

29. The memory of claim 28, wherein the one or more portions of the memory are neighbors to at least one portion of the memory identified from the updated hardware buffer in accordance with a policy.

30. The memory of claim 29, wherein the policy is to identify a preconfigured number of most frequently used (MFU) portions of the memory.

31. The memory of claim 26, wherein the sampling and the performing of one or more attack mitigation actions is repeated for each refresh period configured for the memory.

32. A memory controller that interfaces a memory, comprising:

a hardware buffer to track memory access requests that have been pseudo-randomly or randomly sampled from a stream of memory access requests issued to the memory; and logic that:

(a) updates the hardware buffer based on the memory access requests sampled from the stream including, for each of the memory access requests:

determining whether the hardware buffer includes an existing entry tracking accesses for a portion of the memory associated with the memory access request;

when the hardware buffer includes the existing entry for the portion of the memory associated with the memory access request, updating an access counter included in the existing entry; and when the hardware buffer does not include the existing entry for the portion of the memory associated with the memory access request:

when the hardware buffer is occupied above a threshold or is full, evicting from the hardware buffer an existing entry tracking accesses for another portion of the memory, and inserting a new entry in the hardware buffer for the portion of the memory associated with the memory access request, and (b) uses the updated hardware buffer to cause the memory to perform one or more attack mitigation actions.

33. The memory controller of claim 32, wherein the hardware buffer is implemented in static random access memory (SRAM).

34. The memory controller of claim 32, wherein causing the memory to perform one or more attack mitigation actions includes issuing a refresh management (RFM) command to the memory that indicates one or more portions of the memory identified from the updated hardware buffer based on a policy, wherein the memory is configured to respond to the RFM command by performing the one or more attack mitigation actions in association with the one or more portions of the memory indicated in the RFM command.

35. The memory controller of claim 34, wherein the one or more attack mitigation actions include refreshing one or more other portions of the memory that are neighbors to one or more portions of the memory indicated in the RFM command.

\* \* \* \* \*